(12) United States Patent
Oka et al.

(10) Patent No.: US 9,157,736 B2
(45) Date of Patent: Oct. 13, 2015

(54) PORTABLE ELECTRONIC DEVICE ADAPTED TO PROVIDE AN IMPROVED ATTITUDE MATRIX

(71) Applicant: BlackBerry Limited, Waterloo (CA)

(72) Inventors: Anand Ravindra Oka, Waterloo (CA); Nazih Almalki, Waterloo (CA); Christopher Harris Snow, Kitchener (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days.

(21) Appl. No.: 14/230,677

(22) Filed: Mar. 31, 2014

(65) Prior Publication Data

US 2014/0214357 A1    Jul. 31, 2014

Related U.S. Application Data

(63) Continuation of application No. 13/036,563, filed on Feb. 28, 2011, now Pat. No. 8,688,403.

(51) Int. Cl.
G01C 9/00     (2006.01)
G01B 21/16    (2006.01)
G06F 15/00    (2006.01)
G01C 19/00    (2013.01)

(52) U.S. Cl.
CPC ............... *G01B 21/16* (2013.01); *G01C 19/00* (2013.01); *G06F 15/00* (2013.01)

(58) Field of Classification Search
CPC .............................. G06F 15/00; G01C 19/00
USPC .................................. 702/150, 153, 141, 93
See application file for complete search history.

(56) References Cited

U.S. PATENT DOCUMENTS 7,587,277 B1 *   9/2009  Wells ............................ 701/510
8,688,403 B2 *   4/2014  Oka et al. ..................... 702/153
2010/0121599 A1 * 5/2010 Boeve et al. .................. 702/93

* cited by examiner

*Primary Examiner* — Janet Suglo
*Assistant Examiner* — Stephanie Bloss
(74) *Attorney, Agent, or Firm* — Perry + Currier Inc.

(57) ABSTRACT

According to one aspect, a method of determining an attitude matrix on a portable electronic device. The method includes determining a first attitude matrix gradient using data from at least one of an accelerometer and a magnetometer, determining a second attitude matrix gradient using data from a gyroscope, fusing the first attitude matrix gradient and the second attitude matrix gradient based on a mixing coefficient to generate a fused gradient, and based on the fused gradient, updating a fine attitude matrix for the portable electronic device.

20 Claims, 6 Drawing Sheets

PORTABLE ELECTRONIC DEVICE ADAPTED TO PROVIDE AN IMPROVED ATTITUDE MATRIX

RELATED APPLICATIONS

This application is a continuation of U.S. patent application Ser. No. 13/036,563, now U.S. Pat. No. 8,688,403, the entire contents of which are hereby incorporated by reference herein for all purposes.

FIELD

Embodiments herein relate to portable electronic devices, and in particular to portable electronic devices adapted to provide an improved attitude matrix.

BACKGROUND

Portable electronic devices have gained widespread use and may provide various functions including telephonic functions, electronic text messaging or other personal information manager (PIM) application functions, gaming, navigation, and so on. Portable electronic devices may include various types of devices such as cellular phones, smart phones, Personal Digital Assistants (PDAs), and tablet computers.

In some cases, portable electronic devices may be touch sensitive devices. For example, some devices may include a display (e.g. a liquid crystal display (LCD)) with a touch-sensitive overlay, which may be particularly useful in a tablet computing device or where limited space is available for user input.

In some embodiments, a portable electronic device may include a keypad having a plurality of keys and optionally one or more function buttons in addition to the display. Other devices may not have a keypad.

BRIEF DESCRIPTION OF THE DRAWINGS

Embodiments of the present disclosure will now be described, by way of example only, with reference to the attached figures, in which.

DETAILED DESCRIPTION

Figure 1:
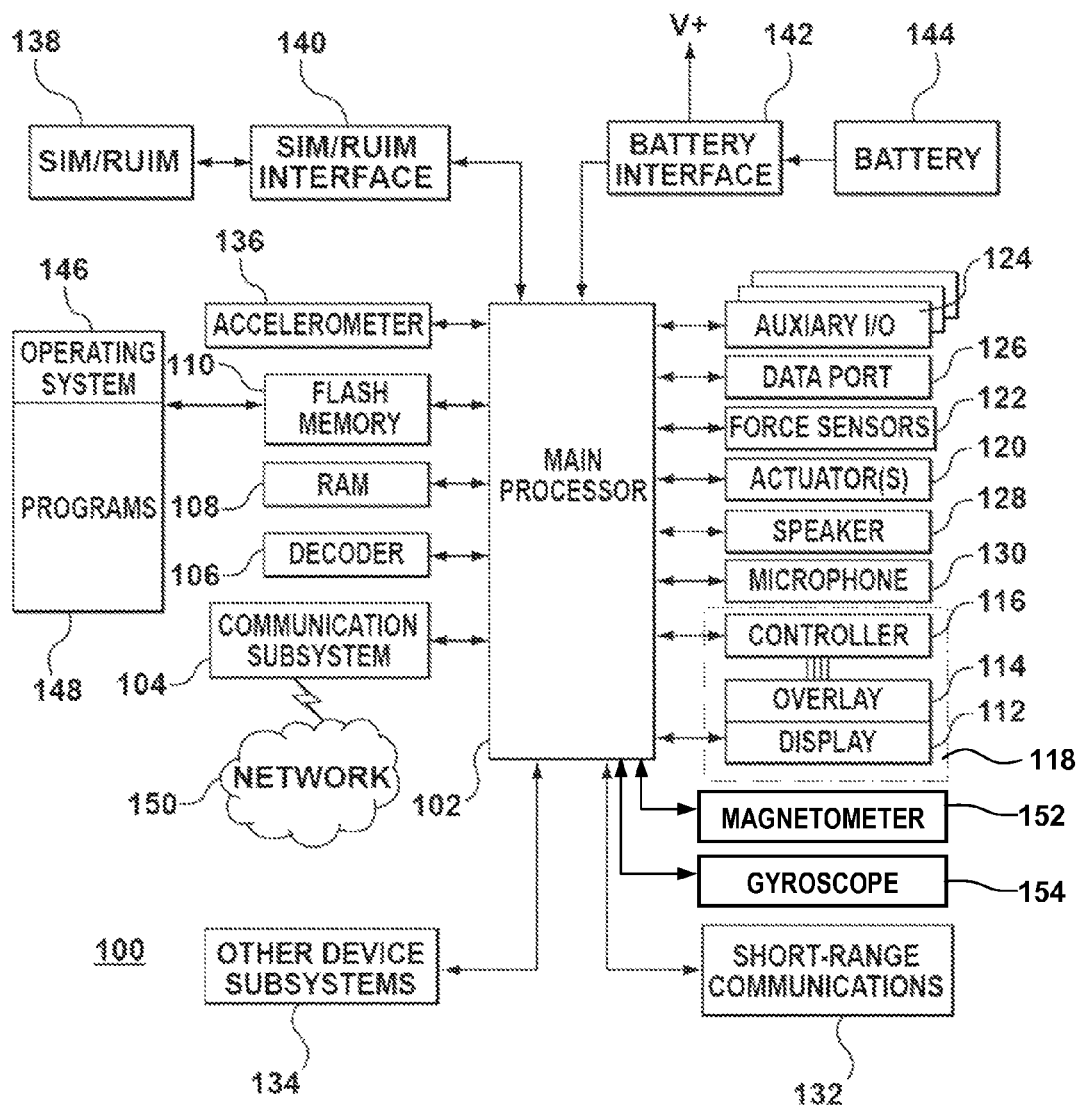
FIG. 1 is a simplified block diagram of components of a portable electronic device according to one embodiment.

It will be appreciated that for simplicity and clarity of illustration, where appropriate, reference numerals may be repeated among the figures to indicate corresponding or analogous elements. In addition, numerous specific details are set forth in order to provide a thorough understanding of the example embodiments described herein. In some instances, well-known methods, procedures and components have not been described in detail so as not to obscure the embodiments described herein.

According to some embodiments, there is provided a method of determining an attitude matrix on a portable electronic device, comprising determining a first attitude matrix gradient using data from at least one of an accelerometer and a magnetometer, determining a second attitude matrix gradient using data from a gyroscope, fusing the first attitude matrix gradient and the second attitude matrix gradient based on a mixing coefficient to generate a fused gradient, and based on the fused gradient, updating a fine attitude matrix for the portable electronic device.

According to some other embodiments, there is provided a portable electronic device, comprising a gyroscope for detecting the rotational velocity of the device, an accelerometer for detecting the acceleration experienced by the device, a magnetometer for determining the position and orientation of the device with respect to a magnetic field, and at least one processor coupled with the gyroscope, the accelerometer and the magnetometer, the at least one processor adapted to: determine a first attitude matrix gradient using data from at least one of the accelerometer and a magnetometer, determine a second attitude matrix gradient using data from the gyroscope, fuse the first attitude matrix gradient and second attitude matrix gradient based on a mixing coefficient to generate a fused gradient, and based on the fused gradient, update a fine attitude matrix for the portable electronic device.

FIG. 1 shows a simplified block diagram of components of a portable electronic device 100 according to one embodiment. As shown, the portable electronic device 100 includes a processor 102 that controls at least some operations of the portable electronic device 100.

Communication functions, including data communications, voice communications, or both may be performed through a communication subsystem 104. In some embodiments, data received by the portable electronic device 100 may be decompressed and decrypted by a decoder 106.

The portable electronic device 100 may be a battery-powered device and as shown may include a battery interface 142 for receiving one or more batteries 144.

The communication subsystem 104 may receive messages from, and send messages to, a wireless network 150. The wireless network 150 may be any type of wireless network, including, but not limited to, data-centric wireless networks, voice-centric wireless networks, and dual-mode networks that support both voice and data communications (for example a 3G or 4G network).

The processor 102 generally interacts with subsystem components such as a Random Access Memory (RAM) 108, a flash memory 110, and a display 112 (which may have a touch-sensitive overlay 114 connected to an electronic controller 116 that together form a touch-sensitive display 118). Information, such as text, characters, symbols, images, icons, and other items may be displayed on the touch-sensitive display 118.

In some embodiments, user-interaction with the graphical user interface may be performed through the touch-sensitive overlay 114. In particular, the processor 102 may interact with the touch-sensitive overlay 114 via the electronic controller 116.

Other components could include an actuator assembly 120, one or more optional force sensors 122, an auxiliary input/output (I/O) subsystem 124, a data port 126, one or more speakers 128, a microphone 130, a short-range communications module 132 and other device subsystems 134.

In some embodiments, to identify a user as a subscriber for network access, the portable electronic device 100 may use a Subscriber Identity Module (SIM) or a Removable User Identity Module (RUIM) card 138 inserted into a SIM/RUIM interface 140 for communication with the wireless network 150. Alternatively, user identification information may be programmed into the flash memory 110, or via other techniques.

The portable electronic device 100 also generally includes an operating system 146 and software components 148 that are executed by the processor 102. The operating system 146 and software components 148 may be stored in a persistent data storage device, such as the flash memory 110 or another data storage device.

In some embodiments, applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download may be processed by the communication subsystem 104 and input to the processor 102. The processor 102 may then process the received signal for output to the display 112 or to the auxiliary I/O subsystem 124 (or both). In some embodiments, a user may compose data items, such as e-mail messages, which may be transmitted over the wireless network 150 through the communication subsystem 104.

For voice communications, the overall operation of the portable electronic device 100 may be similar. For example, the speaker 128 may output audible information converted from electrical signals, and the microphone 130 may convert received audible information into electrical signals for processing.

As shown, the processor 102 may also be coupled to an accelerometer 136. The accelerometer 136 may be used for detecting the acceleration experienced by the device 100, for example by measuring the direction of gravitational forces or gravity-induced reaction forces on the device 100. The accelerometer 136 generally measures weight per unit of mass, also known as specific force or G-forces (Gs), acting on the device 100.

For example, when the device 100 is at rest, the accelerometer 136 will record the effect of gravity on the device 100 as one G acting downward, generally towards the center of the Earth. On the other hand, if the device is being lifted, then the accelerometer 136 will record a force more than one G acting on the device 100. In contrast, when the device 100 is in free fall (e.g. when the device 100 has been dropped), the accelerometer 136 will measure zero Gs acting on the device 100.

In some embodiments, the accelerometer 136 could include a cantilever beam with a proof mass and suitable deflection sensing circuitry for detecting the acceleration forces acting on the device 100.

As shown, the portable electronic device 100 also includes a magnetometer 152 or another suitable electronic compass. The electronic compass may facilitate location and direction based services, such as navigation services, by sensing the position of the portable electronic device 100 in relation to one or more magnetic fields, particularly the Earth's magnetic field.

In some embodiments, the magnetometer 152 may include a multi-axis magneto-impedance sensor (e.g. a three-axis magneto-impedance sensor) or another suitable sensor. For example, the magnetometer 152 may include three magneto-impedance (MI) sensors within a single integrated circuit package, each MI sensor operable to detect a magnetic field along a particular axis. The portable electronic device 100 can use signals from the MI sensors to determine direction or location information (or both) for the portable electronic device 100, which may be useful for navigating or for other applications.

Figure 2:
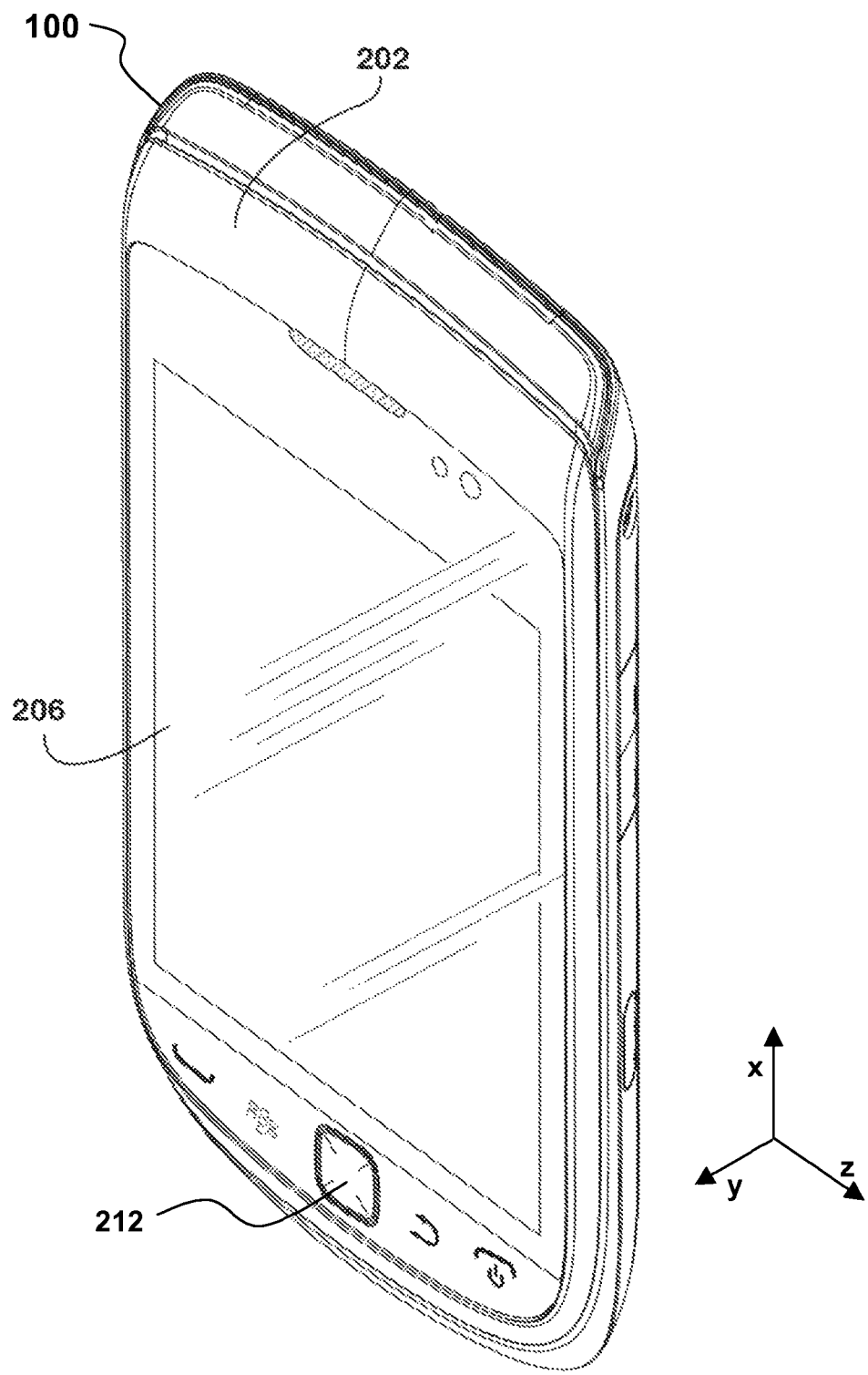
FIG. 2 is a first perspective view of the portable electronic device.

In particular, in a three-axis magneto-impedance sensor, magnetic fields may be measured along each of three orthogonal axes (e.g. an x-axis, a y-axis and a z-axis as shown in FIG. 2). In some embodiments the magnetic fields may be measured in cooperation with measurements from the accelerometer 136 to help determine an attitude matrix for the device 100 such that the position and direction of the portable electronic device 100 with respect to a global coordinate system can be determined. The measurement of magnetic fields may be subject to a certain degree of error or noise that depends on the characteristics of the sensor in the electronic compass (e.g. the quality of the magnetometer 152), magnetic interference in the operating environment, and so on.

Generally, an attitude matrix is a 3×3 matrix that describes the orientation and position of the portable electronic device 100 with respect to a global coordinate system. The columns of the attitude matrix are normally global unit vectors (for example along the EAST, NORTH and UP directions) expressed in a local (e.g. device 100) coordinate system.

The attitude matrix can be viewed as a transformation that takes global vectors and maps them into the local frame of reference. For example, if a vector s represents the position or orientation of a particular object (e.g. a star in the sky) in a global coordinate system, the position of that particular object in the local coordinate system is given by U s, where U is the attitude matrix. Thus, the vector U s, plotted in the local coordinate system, always points to that particular object (e.g. that particular star) regardless of how the device 100 is held or moved.

Conversely the transpose of the attitude matrix U can be viewed as a transformation that calculates the global coordinates of a vector that is known with respect to a local frame of reference. This can be used, for example, to get the absolute orientation of a particular portion of the device 100 (e.g. the top of the device 100) in the global coordinate system to determine, for example, which physical object that portion of the device 100 is pointing towards.

As shown in FIG. 1, the portable electronic device 100 also includes a gyroscope 154. The gyroscope 154 is adapted to measure the rotational velocity of the portable electronic device 100 in the local frame of reference of the device 100. For example, when the device 100 is at rest, the gyroscope 154 generally indicates that the device 100 is stationary. Conversely, when the device 100 is being rotated (e.g. about one or more of the x-axis, the y-axis and the z-axis as shown in FIG. 2), the gyroscope 154 indicates the relative movement of the device 100 about one or more of these axes. In particular, the gyroscope 154 may be a 3-axis gyroscope adapted to measure pitch, roll and yaw of the device 100 about three axes (e.g. the x-axis, the y-axis and the z-axis).

The gyroscope 154 may be useful for various purposes, such as for detecting specific movements of the device 100 as gestures (e.g. when a user tilts or rotates the device 100 in a specific manner), which could be used to control movement of one or more objects displayed on the display screen of the device 100 or for other purposes. The gyroscope 154 may be particularly useful for gaming, where gestures with the device 100 may be used to move a game piece, turn a steering wheel in a racing game, and so on.

The gyroscope 154 may also be useful for other applications, such as augmented reality applications. For example, an augmented reality application may work in conjunction with an image or video camera to display images (in some embodiments in real-time or substantially real time) of the surrounding environment overlaid with information of interest to the user (e.g. street names of the streets displayed on the display, menus for a restaurant being displayed, arrows indicating directions to a desired location such as a parked car, labels of stars and constellations in the night sky, and so on).

In some embodiments, the gyroscope 154 could include an electronic gyroscope, such as a vibrating structure gyroscope manufactured with MEMS technology (e.g. a MEMS gyroscope). A MEMS gyroscope is a low-cost sensor that tends to be suitable for use with portable electronic devices 100. In other embodiments, other suitable gyroscopes 154 may be used in the portable electronic device 100.

Turning now to FIG. 2, illustrated generally therein is a perspective view of the portable electronic device 100 according to one embodiment. As shown, in this embodiment the portable electronic device 100 has a housing 202 that generally includes the functional components therein (e.g. the processor 102, the RAM 108, the accelerometer 136, the magnetometer 152, and the gyroscope 154). As shown, the housing 202 also supports a display 206. The display 206 could be an LCD or other suitable display and may be a touch screen (e.g. the touch screen display 118).

For reference, the coordinate system shown in FIG. 2 has been defined as having the x-axis aligned with a longitudinal axis of the portable electronic device 100, the y-axis normal to the plane of the display 206, and the z-axis perpendicular to the x-axis and y-axis. It will be appreciated that this is for convenience only and that other coordinate systems could also be defined, and in particular the portable electronic device 100 may have various other shapes and configurations.

As described above, an attitude matrix is a 3×3 matrix that describes the orientation of the portable electronic device 100 with respect to a global coordinate system. Theoretically, the calculation of the attitude matrix for the portable electronic device 100 can be done accurately using only the data from the accelerometer 136 and magnetometer 152 (or another electronic compass).

In particular, under ideal conditions when the portable electronic device 100 is at rest (so that the accelerometer 136 is measuring only the Earth's gravity and no other acceleration forces) and no magnetic perturbations are present (so that the magnetometer 152 is measuring only the Earth's magnetic field), the accelerometer 136 and magnetometer 152 may provide a very accurate estimate of the attitude matrix for the portable electronic device 100.

However, all types of sensors tend to be subject to some amount of noise or other factors that can impact the accuracy and precision of their measurements. The accelerometer 136 and magnetometer 152 are no exception, and generally speaking tend to be noisy sensors that are highly susceptible to environmental and other factors that impact the precision of their measurements.

Moreover, the ideal conditions described above rarely occur in the physical environments experienced by the device 100. For example, during use the portable electronic device 100 may experience significant accelerations that can vary greatly with time as the user holding or wearing the portable electronic device 100 moves around, makes gestures using the device 100, and so on.

Furthermore, most environments include at least some magnetic perturbations that can affect the readings of the magnetometer 152 or another electronic compass. In particular, most modern home and office environments include a wide range of objects that can cause magnetic perturbations, for example, due to iron in furniture, magnets located near the portable electronic device 100 (e.g. in a holster, in a laptop, etc.), the magnetic effects from a television or other appliances, and so on.

As a result of these perturbations and environmental factors, an attitude matrix calculated using only data from the accelerometer 136 and magnetometer 152 tends to be very noisy and error-prone. This can impact the usefulness of the attitude matrix and can lead to errors that may be particularly problematic when using some applications (e.g. navigation or augmented reality applications).

Fortunately, in spite of their sensitivity to noise, the accelerometer 136 and magnetometer 152 tend to be relatively unbiased sensors. Accordingly, by taking a number of readings from the accelerometer 136 and magnetometer 152 over a sufficiently long period of time and then averaging the results (also known as statistical filtering), compensations can be made for the noise effects and a more accurate estimate of the attitude matrix can be obtained.

However, to achieve adequate noise reduction, relatively aggressive low-pass filtering of the accelerometer 136 and magnetometer 152 data may need to be performed. This can reduce the agility or responsiveness of the subsequently calculated attitude matrix to changes in the position or orientation of the device 100. In particular, the filtered accelerometer 136 and magnetometer 152 data may tend to lag by an amount that depends on the duration of the memory being used to filter the data.

Therefore, this filtering technique is poorly suited for tracking fast gestures or movements of the portable electronic device 100 that are often used for some applications (e.g. in gaming). In some instances, these filtering techniques may completely miss certain movements of the device 100, such as rapid periodic motions (e.g. swinging the device 100 when jogging), that tend to be washed out due to the averaging of the measurements.

Accordingly, some embodiments as described herein are directed to providing a reliable attitude matrix without sacrificing agility such that the portable electronic device 100 may be able to accurately and quickly react to changes in the orientation or position of the device 100.

In some embodiments, the gyroscope 154 may be used along with the accelerometer 136 and magnetometer 152 to estimate the attitude matrix.

Gyroscopes tend to be relatively immune to noise and other effects (e.g. perturbations due to acceleration of the device 100 or variations in the local magnetic fields) that could affect the precision of the gyroscope readings. Accordingly, the gyroscope 154 can be considered as a relatively low noise sensor. Furthermore, gyroscopes tend to be very responsive, and can quickly recognize abrupt movements or gestures of the portable electronic device 100. However, gyroscopes do tend to suffer from a large sensor bias called gyroscope bias that greatly affects the accuracy of their readings. In some embodiments, this bias may be compensated for by a separate bias-compensation mechanism.

As discussed above, the gyroscope 154 measures the rotational velocity of the device 100 with respect to a local frame of reference. By itself, the gyroscope 154 usually cannot maintain an attitude matrix for extended periods of time. However, by fusing data from the accelerometer 136, magnetometer 152 (or another electronic compass) with data from the gyroscope 154, a reduction in the noise in the estimated attitude matrix can be obtained.

For example, according to some embodiments, a first attitude matrix gradient (e.g. an accelerometer/magnetometer attitude matrix gradient) may be determined using data from the accelerometer 136 and magnetometer 152, and a second attitude matrix gradient (e.g. a gyroscope attitude matrix gradient) may be determined using data from the gyroscope 154. The first and second attitude matrix gradients may then be fused or blended together based on a selected mixing coefficient (which can vary with time and context) to obtain a fused gradient. This fused gradient can then be used to update (e.g. by continuous integration) the fine attitude matrix for the portable electronic device 100.

In some embodiments, these steps may be repeated to generate a continuously updated fine attitude matrix for the portable electronic device 100 using the accelerometer 136, magnetometer 152, and the gyroscope 154.

Moreover, the mixing coefficient may be varied based on one or more factors to affect the relative importance of the first and second attitude matrix gradients on the fine attitude matrix and provide a balance between accuracy and agility.

Figure 6:
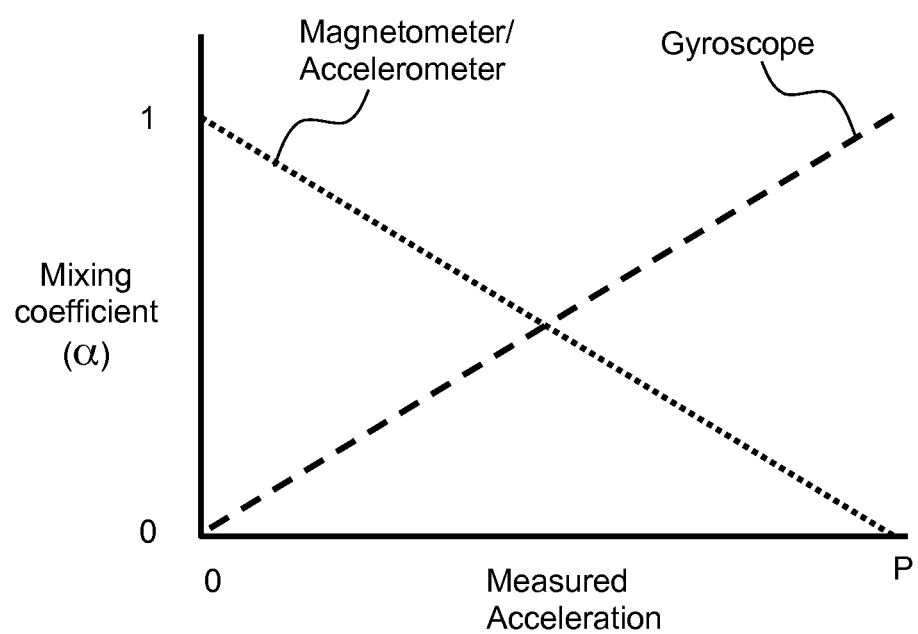
FIG. 6 is a schematic illustration showing how varying the mixing coefficient changes the importance of the first and second attitude matrices on the fine attitude matrix.

For example, as shown in FIG. 6, the mixing coefficient may be varied based on the current acceleration of the portable electronic device 100. When the device 100 experiences an acceleration at least substantially similar to Earth's gravity (which includes when the device 100 is at rest or moving at a steady velocity), the attitude matrix gradient calculated from accelerometer and magnetometer data will be accurate and hence the mixing coefficient can be adjusted to increase the relative importance of the accelerometer/magnetometer attitude matrix gradient and decrease the importance of the gyroscope attitude matrix gradient.

Conversely, when the device 100 experiences an acceleration substantially different from Earth's gravity (which includes the case of a free fall) (e.g. up to some particular threshold value P) the attitude matrix gradient calculated from accelerometer 136 and magnetometer 152 may be inaccurate and hence the mixing coefficient can be adjusted so that the effects of the gyroscope attitude matrix gradient are dominant and the effects of the accelerometer/magnetometer attitude matrix gradient are reduced (as shown in FIG. 6 for example).

Figure 3:
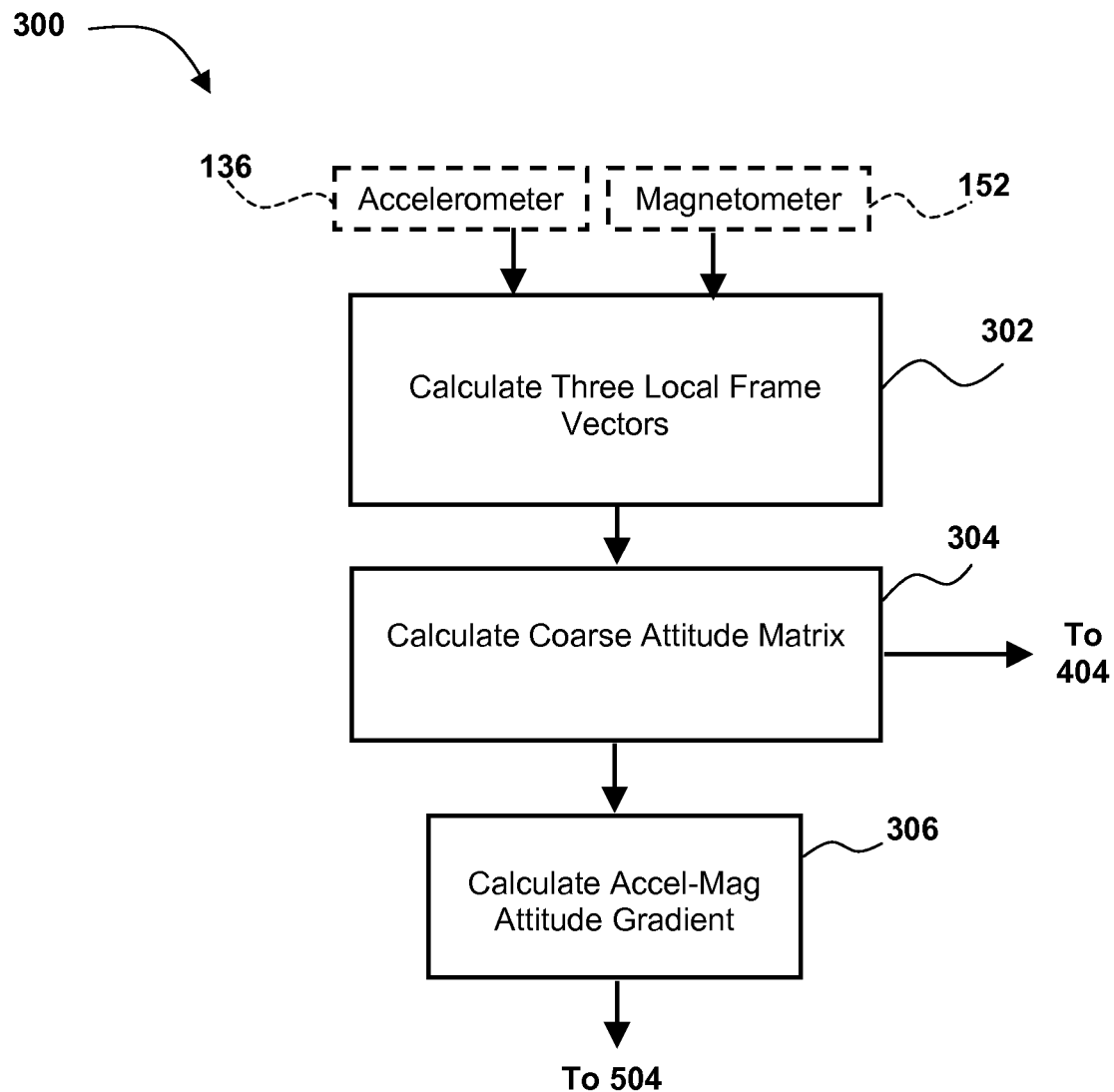
FIG. 3 is a flowchart of a method of determining a first attitude matrix gradient based on data from an accelerometer and a magnetometer.

In particular, turning now to FIG. 3, illustrated therein is a method 300 of determining a first attitude matrix gradient (e.g. an accelerometer/magnetometer attitude matrix gradient) according to one embodiment.

At step 302, at least three local frame vectors are determined based on data from the accelerometer 136 and magnetometer 152. For example, EAST, NORTH and UP vectors may be calculated for the local frame of reference of the portable electronic device 100. In particular, the UP vector may be determined from the accelerometer 136 data, the EAST vector may be determined as a cross product of the magnetometer 152 data and the UP vector, and a NORTH vector may be determined as a cross product of the UP vector and the EAST vector.

At step 304, the local frame vectors (e.g. EAST, NORTH and UP) calculated at step 302 may be used to determine the current coarse (or raw) attitude matrix A. This current coarse attitude matrix A generally describes the current position and orientation of the portable electronic device 100 relative to a global coordinate system.

At step 306, the current coarse attitude matrix A is used to determine an estimate of the first attitude matrix gradient (e.g. the accelerometer/magnetometer attitude matrix gradient C). In particular, the accelerometer/magnetometer attitude matrix gradient C may be determined by taking the transpose $A^T$ of the current coarse attitude matrix A and subtracting the previously estimated fine attitude matrix U therefrom.

During an initialization routine (e.g. during or before the first time the method 300 is executed), the fine attitude matrix U may be initialized to a particular variable (e.g. an identity matrix or another suitable non-zero value). However, generally during repeated execution of the method 300 the fine attitude matrix U will be the output from step 506 as described below.

In some embodiments, during an initialization routine, the coarse attitude matrix A may also be initialized to a particular variable (e.g. an identity matrix or another suitable non-zero value).

The resulting accelerometer/magnetometer attitude matrix gradient C may then be outputted to step 504 as described further below.

This accelerometer/magnetometer attitude matrix gradient C tends to be noisy when the device 100 is accelerating or experiencing perturbations in the magnetic field. Accordingly, as will be discussed further below, the mixing coefficient can be selected to reduce the relative importance of the accelerometer/magnetometer attitude matrix gradient C when the device 100 is accelerating or experiencing perturbations in the magnetic field.

Figure 4:
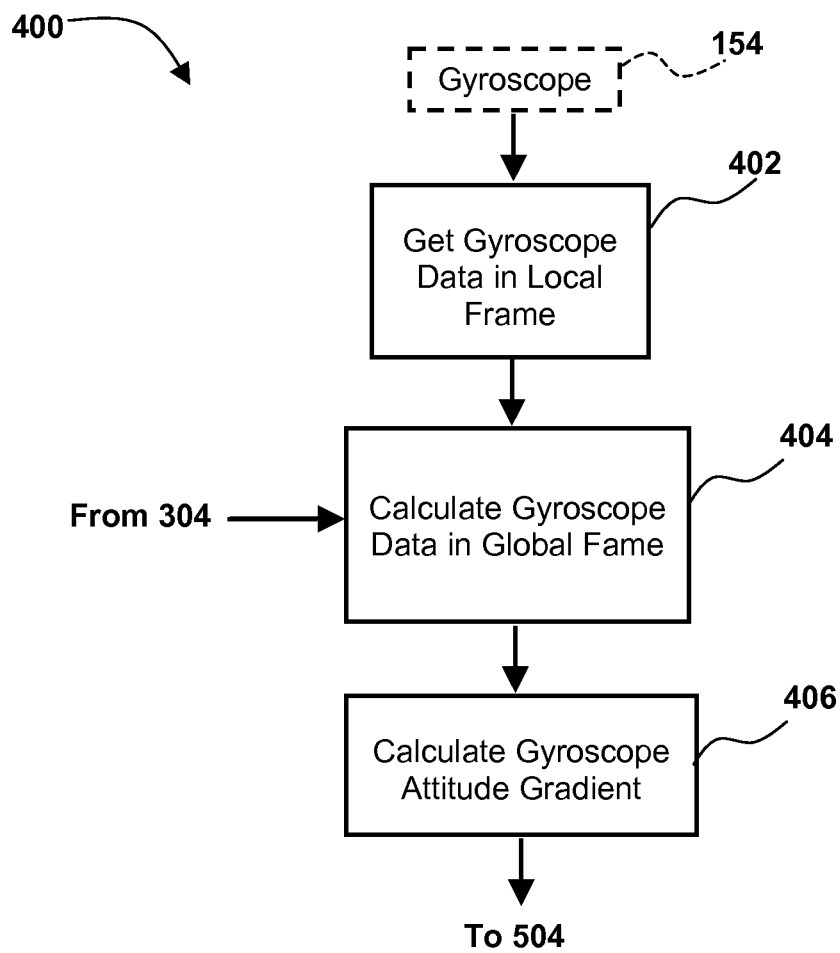
FIG. 4 is a flowchart of a method of determining a second attitude matrix gradient based on data from a gyroscope.

Turning now to FIG. 4, illustrated therein is a method 400 of determining a second attitude matrix gradient (e.g. a gyroscope attitude matrix gradient) according to one embodiment.

At step 402, the raw output W of a gyroscope (e.g. the gyroscope 154) is obtained. This raw output W is indicative of the measured rotational velocity of the portable electronic device (e.g. device 100) with respect to a local (e.g. device 100) frame of reference.

At step 404, an estimate of the gyroscope data (e.g. the rotational velocity of the device 100) with respect to a global frame of reference is determined (indicated generally as global gyroscope data WG). In particular, the global gyroscope data WG may be determined by pre-multiplying the raw output W of the gyroscope 154 by the transpose $A^T$ of the current coarse attitude matrix A (e.g. as determined at step 304).

Then, at step 406, the global gyroscope data WG is used to determine the second attitude matrix gradient (e.g. the gyroscope attitude matrix gradient B). For example, as shown the gyroscope attitude matrix gradient B may be determined by taking the cross product of the global gyroscope data WG and a transpose $U^T$ of the previously estimated fine attitude matrix U (e.g. as generated at step 506).

The resulting gyroscope attitude matrix gradient B is then outputted to step 504 as described further below.

While the gyroscope attitude matrix gradient B tends to be very responsive to quick movements of the device 100 (e.g. due to the fast responsiveness of the gyroscope 154), it may be somewhat biased (e.g. due to gyroscope bias or other effects) and since it only measures rotational velocity with respect to a local frame of reference, it cannot maintain an estimate of the attitude matrix on its own for extended periods of time. Accordingly, as will be discussed further below, the mixing coefficient can be selected to increase the relative importance of the gyroscope attitude matrix gradient B when the device 100 is accelerating or quickly being rotated, but reduce the relative importance thereof when the device 100 is at rest.

Figure 5:
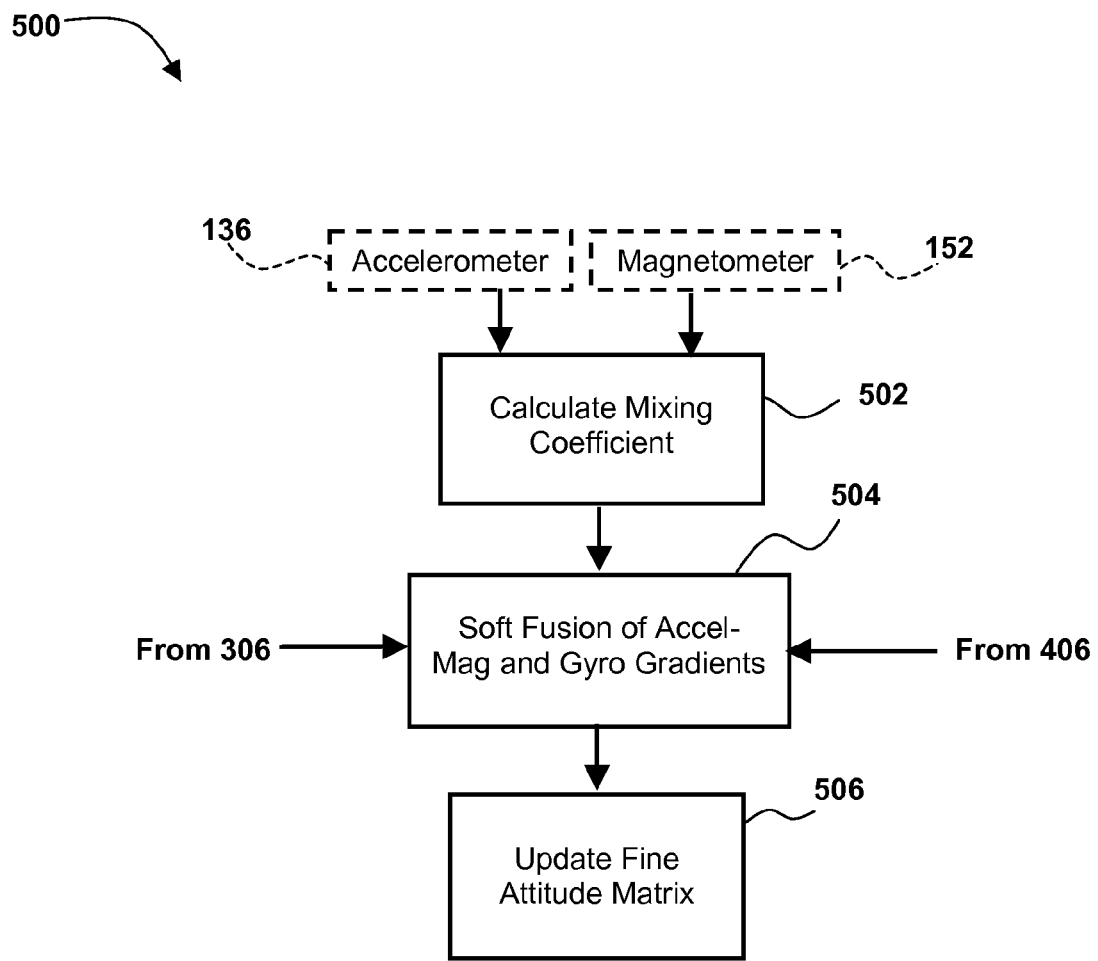
FIG. 5 is a flowchart of a method of providing an updated fine attitude matrix by fusing the first and second attitude matrix gradients using a mixing coefficient.

Turning now to FIG. 5, illustrated therein is a method 500 of providing a fine attitude matrix by fusing the accelerometer/magnetometer attitude matrix gradient C and the gyroscope attitude matrix gradient B according to one embodiment.

In particular, at step 502, a mixing coefficient $\alpha$ is determined. Generally, the mixing coefficient $\alpha$ is indicative of the relative unreliability of the coarse attitude matrix A (as determined at step 304). The mixing coefficient $\alpha$ may be varied based on one or more factors to affect the relative importance of the first and second attitude matrices gradients B, C on the fine attitude matrix U to provide a balance between accuracy and agility.

In some embodiments, instantaneous data from one or more of the accelerometer 136, the magnetometer 152 and (in some cases) the gyroscope 154 may be used to adjust the mixing coefficient $\alpha$. For example, whenever the data from the accelerometer 136 measures an acceleration that is significantly different from Earth's gravitational acceleration (e.g. one G downwards), the mixing coefficient $\alpha$ can be adjusted to give greater weight to the gyroscope attitude matrix gradient B.

Similarly, whenever the magnetometer 152 measures a magnetic field declination that is significantly different from the expected declination of the Earth's magnetic field at that particular location, the mixing coefficient $\alpha$ can be set to give greater weight to the gyroscope attitude matrix gradient B.

Conversely, when the accelerometer 136 and magnetometer 152 indicate that the device 100 is at rest and in a magnetically unperturbed environment, the mixing coefficient $\alpha$ can be set to give greater weight to the accelerometer/magnetometer attitude matrix gradient C.

In some embodiments, as shown in FIG. 6 for example, the mixing coefficient $\alpha$ may vary between 0 and 1. In other embodiments, other relative ranges for the mixing coefficient $\alpha$ may be defined (e.g. 0 to 100, −1 to +1, and so on).

At step 504, a soft fusion or blending of the gyroscope attitude matrix gradient B and accelerometer/magnetometer attitude matrix gradient C is performed using the mixing coefficient $\alpha$ to determine a fused gradient D for the portable electronic device 100. For example, in this embodiment the fused gradient D may be determined according to Equation 1:

$$D=\beta(1-\alpha)C+\Delta\alpha B \quad (1)$$

where $\beta$ and $\Delta$ and first and second weighting parameters, respectively, as will be described below.

As evidenced by inspection of Equation 1, the mixing coefficient $\alpha$ can have a value selected so that either the gyroscope attitude matrix gradient B or accelerometer/magnetometer attitude matrix gradient C completely dominates the fused gradient D, or both the gyroscope attitude matrix gradient B and accelerometer/magnetometer attitude matrix gradient C contribute to the fused gradient D. For example, as the mixing coefficient $\alpha$ goes to zero, the impact of the gyroscope attitude matrix gradient B on the fused gradient D will go to zero, and the effect of the accelerometer/magnetometer attitude matrix gradient C will dominate.

Conversely, as the mixing coefficient $\alpha$ goes to 1, the impact of the accelerometer/magnetometer attitude matrix gradient C on the fused gradient D will go to zero, and the effects of the gyroscope attitude matrix gradient B will dominate. On the other hand, selecting a mixing coefficient $\alpha$ between 0 and 1 will allow both the matrices B, C to contribute to the fused gradient D.

The first and second weighting parameters $\beta$, $\Delta$ may be fixed values selected to tune the performance at step 504 by adjusting the speed with which the matrices B, C impact the fused gradient D. In particular, in this embodiment the first weighting parameter $\beta$ controls the speed of the accelerometer/magnetometer attitude matrix gradient C, while the second weighting parameter $\Delta$ controls the speed of the gyroscope attitude matrix gradient B.

In some embodiments, the second weighting parameter $\Delta$ may be selected to be much larger than the first weighting parameter $\beta$. This may be useful to compensate for speed differences between the responsiveness of the gyroscope attitude matrix gradient B and the accelerometer/magnetometer attitude matrix gradient C.

In some embodiments, the second weighting parameter $\Delta$ may be equal to the 1 divided by a sampling frequency of the method 500 in Hz (e.g. the frequency at which the method 500 is repeated). In some embodiments, the first weighting parameter $\beta$ may be equal to the second weighting parameter $\Delta$ divided by the residence time of the filter memory (in seconds) for the accelerometer 136 and magnetometer 152 (e.g. how long the accelerometer 136 and magnetometer 152 are filtered to reduce noise).

In some other embodiments, the first and second weighting parameters $\beta$, $\Delta$ may not be fixed, but may instead be adjusted during operation of the portable electronic device 100 (e.g. for example, in some embodiments the sampling frequency and residence time of the filter memory may be adjusted during use of the device 100, and accordingly the first and second weighting parameters $\beta$, $\Delta$ may vary accordingly).

At step 506, the fine attitude matrix U is updated. In particular, the fine attitude matrix U may be updated by adding the fused gradient D thereto. This tends to provide for a relatively accurate fine attitude matrix U that is also agile and responsive to rapid changes in the position and orientation of the device 100.

In particular, this updated fine attitude matrix U can be used by the device 100 with applications that interact with the physical environment, such as navigation applications, games and augmented reality applications, and tends to provide for accurate and responsive interactions.

In some embodiments, the fine attitude matrix U may also be orthonormalized at step 506.

In some embodiments, the methods 300, 400 and 500 as described above may be repeated to provide for continuous (e.g. real time or substantially real time) improvement to the estimates of the fine attitude matrix U. For example, in some embodiments, the methods 300, 400 and 500 may be repeated with a frequency of more than 1 Hz (e.g. more than once per second). In other embodiments, the methods 300, 400 and 500 may be repeated with a frequency of more than 10 Hz. In yet other embodiments, the methods 300, 400 and 500 may be repeated with a frequency of less than 1 Hz.

In some embodiments, the frequency of one method (e.g. method 300) may be less than or greater than the frequency of another method (e.g. method 400).

In some embodiments, one or more of the steps of the methods 300, 400 and 500 as described above may be implemented in various manners. For example, one or more steps of the methods 300, 400 and 500 may be implemented using one or more software modules, one or more hardware modules, or some combination thereof.

In some embodiments, the portable electronic device 100 may include one or more additional input apparatus, such as navigation keys or buttons, a physical or virtual keyboard, a trackpad, trackball, multimedia keys, and the like. For example, the housing 202 in this embodiment includes an auxiliary input device 212. The auxiliary input device 212 may be an optical navigation module (e.g. a trackpad or optical joystick) that responds to user interaction, and which may be used for navigating around the display screen 206, to select objects on the display screen 206, or for other purposes.

The housing 202 may also include other input devices (not shown), such as a dedicated phone application button, a disconnect call button, a home screen button, and the like. In various embodiments, these input devices may include optical sensors, mechanical buttons, or both. In some embodiments the portable electronic device 100 may include a keypad that includes a plurality of alphanumeric keys, which may be positioned in a plurality of rows and columns. In some embodiments, the keys may represent an alphabet and may be arranged in a standard keyboard layout (e.g. QWERTY, QWERTZ, DVORAK, etc.).

Some embodiments herein have referred to a portable electronic device that includes a housing, a touch-sensitive display exposed by a front of the housing, and functional components including memory and a processor coupled to the memory and the touch-sensitive display. However, the teachings herein are not limited to touchscreen devices, but may apply to other types of portable electronic devices such as candybar or slab devices, clamshell or flip devices, swivel devices, and various combinations thereof. In particular, in some examples, the devices may include a keypad and touchscreen, and may include one or more auxiliary buttons, or may include a touchscreen without a keypad. Furthermore, in some embodiments the teachings herein may be used for tablet computing devices.

While the above description provides examples of one or more processes or apparatuses, it will be appreciated that other processes or apparatuses may be within the scope of the accompanying claims.

The invention claimed is:

1. A method of determining an orientation of a portable electronic device, comprising:
   determining, at a processor of the portable electronic device, a first attitude matrix gradient using data obtained from at least one of an accelerometer of the portable electronic device and a magnetometer of the portable electronic device;
   determining, at the processor, a second attitude matrix gradient using data obtained from a gyroscope of the portable electronic device;
   determining, at the processor, in real time or substantially real time, a mixing coefficient having a value based on the data obtained from the accelerometer representative of an acceleration currently experienced by the portable electronic device and the data obtained from the magnetometer representative of a magnetic field currently experienced by the portable electronic device;
   fusing, at the processor, the first attitude matrix gradient and the second attitude matrix gradient based on a mixing coefficient to generate a fused gradient; and
   based on the fused gradient, updating, at the processor, a fine attitude matrix for the portable electronic device to determine the orientation of the portable electronic device with respect to a global coordinate system.

2. The method of claim 1, wherein the fused gradient is determined according to:

$$D=\beta(1+\alpha)C+\Delta\alpha B$$

where D is the fuse gradient, C is the first attitude matrix, B is the second attitude matrix, $\beta$ and $\Delta$ are first and second weighting parameters, and $\alpha$ is the mixing coefficient.

3. The method of claim 1, wherein the value of the mixing coefficient is between 0 and 1.

4. The method of claim 1, further comprising adjusting the mixing coefficient based on one or more of the data obtained from the accelerometer, the data obtained from the magnetometer, and the data received from the gyroscope.

5. The method of claim 1, wherein the mixing coefficient is selected to reduce a relative importance of the first attitude matrix gradient when the acceleration currently experienced by the portable electronic device is substantially different from Earth's gravity.

6. The method of claim 1, wherein the mixing coefficient is selected to reduce a e relative importance of the first attitude matrix gradient when the magnetic field currently experienced by the portable electronic device is substantially different from the generally known local magnetic field.

7. The method of claim 1, wherein the mixing coefficient is selected to reduce relative importance of the second attitude matrix gradient when the acceleration currently experienced by the portable electronic device is substantially similar to Earth's gravity.

8. The method of claim 1, wherein the fused gradient is determined based on at least one weighting parameter selected to adjust a speed with which at least one of the first and second matrix gradients impact the fused gradient.

9. The method of claim 1, wherein the first attitude matrix gradient is determined based on using at least three local frame vectors to determine a coarse attitude matrix.

10. The method of claim 1, wherein the first attitude matrix gradient comprises an accelerometer/magnetometer attitude matrix gradient, and the second attitude matrix gradient comprises a gyroscope attitude matrix gradient.

11. A portable electronic device, comprising:
    a gyroscope configured to detect rotational velocity of the portable electronic device;
    at least one of an accelerometer configured to detect acceleration experienced by the device, and a magnetometer configured to detect a position and an orientation of the device with respect to a magnetic field; and
    at least one processor coupled with the gyroscope, the accelerometer and the magnetometer, the at least one processor configured to:
       determine a first attitude matrix gradient using data obtained from at least one of the accelerometer and a magnetometer;
       determine a second attitude matrix gradient using data obtained from the gyroscope;
       determine in real time or substantially real time, a mixing coefficient having a value based on the data obtained from the accelerometer representative of an acceleration currently experienced by the portable electronic device and the data obtained from the magnetometer representative of a magnetic field currently experienced by the portable electronic device;
       fuse the first attitude matrix gradient and second attitude matrix gradient based on a mixing coefficient to generate a fused gradient; and
       based on the fused gradient, update a fine attitude matrix for the portable electronic device to determine the orientation of the portable electronic device with respect to a global coordinate system.

12. The device of claim 11, wherein the fused gradient is determined according to:

$$D=\beta(1+\alpha)C+\Delta\alpha B$$

where D is the fuse gradient, C is the first attitude matrix, B is the second attitude matrix, $\beta$ and $\Delta$ are first and second weighting parameters, and $\alpha$ is the mixing coefficient.

13. The method of claim 11, wherein the value of the mixing coefficient is between 0 and 1.

14. The device of claim 11, wherein the at least one processor is configured to select the mixing coefficient to reduce a relative importance of the first attitude matrix gradient when the accelerometer determines that the device is experiencing an acceleration substantially different from Earth's gravity.

15. The device of claim 11, wherein the at least one processor is configured to reduce the relative importance of the first attitude matrix gradient when the magnetometer determines that the device is experiencing a magnetic field substantially different from the known local magnetic field.

16. The device of claim 11, wherein the at least one processor is configured to reduce the relative importance of the second attitude matrix gradient when the accelerometer determines that the device is experiencing an acceleration substantially similar to Earth's gravity.

17. The device of claim 11, wherein the fused gradient is based on at least one weighting parameter selected to adjust a speed with which at least one of the first and second matrix gradients impacts the fused gradient.

18. The device of claim 11, wherein the at least one processor is configured to determine the first attitude matrix gradient based on using at least three local frame vectors to determine a coarse attitude matrix.

19. The device of claim 11, wherein at least one processor is configured to determine the second attitude matrix gradient by converting an output of the gyroscope in a local frame of reference to global gyroscope data in a global frame of reference by pre-multiplication of raw output by a transpose of the current coarse attitude matrix, and subsequently determine the second attitude matrix gradient by taking a cross product of the global gyroscope data with a transpose of a previous estimate of the fine attitude matrix.

20. A non-transitory computer-readable medium storing instructions which, when executed by a processor of portable electronic device configure the processor to:

determine, at a processor of the portable electronic device, a first attitude matrix gradient using data obtained from at least one of an accelerometer of the portable electronic device and a magnetometer of the portable electronic device;

determine, at the processor, a second attitude matrix gradient using data obtained from a gyroscope of the portable electronic device;

determine, at the processor, in real time or substantially real time, a mixing coefficient having a value based on the data obtained from the accelerometer representative of an acceleration currently experienced by the portable electronic device and the data obtained from the magnetometer representative of a magnetic field currently experienced by the portable electronic device;

fuse, at the processor, the first attitude matrix gradient and the second attitude matrix gradient based on a mixing coefficient to generate a fused gradient; and based on the fused gradient, update, at the processor, a fine attitude matrix for the portable electronic device to determine an orientation of the portable electronic device with respect to a global coordinate system.

* * * * *